United States Patent
Parker et al.

(10) Patent No.: US 6,441,919 B1
(45) Date of Patent: Aug. 27, 2002

(54) INTEGRATED RENDERING AND COMPOSITING IN VARIABLE PRINTING

(75) Inventors: Michael L. Parker; John Gaffney, both of Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/145,795

(22) Filed: Sep. 2, 1998

(51) Int. Cl.[7] .............................................. G06F 13/00

(52) U.S. Cl. ....................... 358/1.18; 358/1.1; 358/1.15

(58) Field of Search ......................... 358/1.1, 1.5, 1.12, 358/1.13, 1.15, 1.16, 1.17, 1.18

(56) References Cited

U.S. PATENT DOCUMENTS 6,076,120 A * 6/2000 Hatayama .................... 710/20

OTHER PUBLICATIONS

Adobe Sysytems Incorporated, "IBM and Adobe Unveil First SUPRA–Based Printing Solution", Press Release Oct. 22, 1996, 2 pgs.
Adobe Systems Incorporated, "PDF for Production Printing", Sep. 1996, 5 pgs.
Adobe Systems Incorporated, "PDF for Prepress Workflow and Document Delivery", 1997, 8 pgs.
Adobe Systems Incorporated, "Adobe Printing Solutions", copyright 1977, 4 pgs.
Adobe Systems Incorporated, "Adobe PostScript Extreme and PDF", 8 pgs.
Adobe Systems Incorporated, "Postscript Extreme White Paper", (Adobe FYI No. 902002), copyright 1997, 7 pgs.
Adobe Systems Incorporated, "PostScript Extreme White Paper", (Adobe FYI No.516424), copyright 1997, 6 pgs.
Bienz et al., "Portable Document Format", Adobe Systems Incorporated, Reference Manual, version 1.2, Nov. 27, 1996, 14 pgs.
Adobe Systems Incorporated, "PostScript Language Reference Manual", Addison–Wesley Puslishing Co., Sec. Edition 7 pgs.
S. Hannaford, "Supra nad PDF," Adobe Magazine, Spring 1997, pp. 24–26.

* cited by examiner

Primary Examiner—Mark Wallerson
(74) Attorney, Agent, or Firm—Fish & Richardson P.C.

(57) ABSTRACT

Methods and apparatus implementing techniques useful in variable printing. A technique for rendering reusable objects and other objects includes rendering the reusable objects, storing the resulting raster data in a cache, and then rendering and compositing a print area by painting the reusable objects and the other objects in paint order into a frame buffer. The reusable objects are read and composited from the cache and the other objects are rendered directly into the frame buffer as needed. The raster data resulting from reusable objects can include data specifying which pixels are transparent. The reusable objects can include two objects overlapping each other on the print area. The technique can include providing multiple integrated rasterizer-compositors, assigning a rasterizer-compositor to render each of the reusable objects, and assigning a rasterizer-compositor to render the print area. Apparatus can include an integrated rasterizer-compositor module to render page description language reusable objects into raster data reusable objects and causing the raster data to be stored in a cache, and to composite page reusable objects and other objects into a frame buffer by rendering and compositing other objects into the frame buffer on the fly. Apparatus can also include a scheduler to receive from an input stream description identifying the objects required for a print area, the required objects being either reusable objects or not; to cause only the reusable objects to be rendered and stored in a cache before being used; and to cause the print area to be composited.

31 Claims, 3 Drawing Sheets

INTEGRATED RENDERING AND COMPOSITING IN VARIABLE PRINTING

BACKGROUND OF THE INVENTION

The invention relates to methods and apparatus for personalization of printed documents.

Variable printing involves the production of printed pages that are each personalized while sharing a common structure and content with other pages. As a very simple example, if many copies of a document are to be printed, a user may define the document so that each printed page includes a reusable element, such as a border or corporate logo, and a single-use element, such as a person's name and address.

In conventional variable printing systems, the reusable element is rendered and stored in a cache, from which it is copied as needed into a frame buffer, and the single-use element is rendered by a raster image processor (commonly called a "RIP") to produce a pixelmap (which may be one or more bits deep) and a mask. The mask identifies which of the pixels of the pixelmap are to be painted into a frame buffer to appear on a printed page. The single-use pixelmap is composited with the reusable element in the frame buffer by a compositor. When the page (or band or other unit of printing) in the frame buffer is complete, the page is transmitted to a print engine for printing.

A raster image processor creates raster data from page description language (PDL) data. A PDL is a high level language for describing graphical objects (such as text, vector-based art, raster images, and so on) to be displayed by an output device. Two examples of page description languages are the PostScript® language and the Portable Document Format (PDF) language, both of which are supported by-products available from Adobe Systems Incorporated of San Jose, Calif. ("Adobe Systems"). In general, raster image processing (also called rendering) involves converting PDL data into a raster format (such as a rectangular pixelmap that is one or more bits deep) for printing or other form of display. Raster image processing may occur in the printer side or the host side of a printing process.

The above-described process of variable printing commonly results in either the RIP or the compositor being idle at times. For example, during the latter stages of a print run when the cache already contains all the necessary reusable data, the RIP may be idle while the compositor is busy. In addition, for a complex page containing many single-use and/or reusable elements, the composition process may be slower than the speed of the high-speed print engine. Consequently, during a print run, multiple blank sheets may be printed during portions of the compositing process, thereby slowing the entire print operation and wasting paper.

SUMMARY OF THE INVENTION

The invention provides methods and apparatus, including computer programs, that implement techniques that are useful in the context of variable printing.

In general, in one aspect, the invention features a technique for rendering a description of a print area, the description including graphical objects and a paint order for the graphical objects, the graphical objects including one or more reusable objects and one or more other objects. The technique includes rendering the reusable objects and storing the resulting raster data in a cache; and then rendering and compositing the print area by painting the reusable objects and the other objects in the paint order into a frame buffer memory, the reusable objects being read as raster data from the cache and composited into the frame buffer memory, and the other objects being rendered directly into the frame buffer as the other objects are required by the paint order.

Implementations of the invention can include the following advantageous features. The print area is at least a part of a page, and technique includes receiving a page description language description input stream that includes a description of the page, the reusable objects, and the other objects, that also includes page layout information specifying the positions of the reusable objects and of the other objects on the page, and that also includes information identifying graphical objects as reusable. The input stream is expressed in elements of the Portable Document Format (PDF) version 1.2 page description language; and the information identifying a graphical object as reusable includes the presence of an XUID attribute in a form object. The raster data resulting from the rendering of the reusable objects includes data specifying which pixels of the raster data are transparent. The data specifying transparent pixels is a bitmap mask. The reusable objects include two objects overlapping each other on the print area. The technique includes making the contents of the frame buffer memory available to a print engine when rendering of the print area is completed. The technique includes receiving the reusable objects and the other objects in a print data stream in the Portable Document Format page description language, the print data stream including page layout information specifying the positions of the reusable objects and the other objects on a page. The print area is a page. The cache includes disk storage, and the frame buffer memory is an assigned portion of a random access memory. The technique includes providing multiple integrated rasterizer-compositors; for each of the reusable objects, assigning one of the multiple rasterizer-compositors to render the reusable object; and assigning one of the multiple rasterizer-compositors to render the print area, where any or all of the selected rasterizer-compositors can be the same or different rasterizer-compositors. The technique includes providing a selector to receive the description of the print area, to assign rasterizer-compositors to render reusable objects, and to assign a rasterizer-compositors to render the print area. The technique includes communicating, to the rasterizer-compositor selected to render the print area, the graphical objects to be printed on the print area and the paint order of the graphical objects.

In general, in another aspect, the invention features a technique for preparing personalized pages for printing. The technique includes receiving an input stream describing multiple personalized pages in terms of graphical objects including reusable objects and other objects; rendering each reusable object and caching the resulting raster data for multiple use on one or more of the personalized pages; and rendering a first page of the personalized pages by compositing a first and a second reusable object and a first other object, rendering a second page of the personalized pages by compositing the first reusable object and a third reusable object different from the second reusable object and a second other object different from the first other object, the first page not including the third reusable object and the second page not including the second reusable object. Implementations of the invention can include the following advantageous features. The resulting raster data includes data identifying transparent pixels. The raster data resulting from reusable objects is stored in a cache before compositing into a page; and the other objects are painting by rendering and compositing into a composited page on the fly.

In general, in another aspect, the invention features a technique for preparing personalized pages for printing on a variable printing system. The technique includes providing a print data stream describing multiple personalized pages in terms of graphical objects including reusable objects and other objects; providing a first-level set of one or more reusable objects, each of which appears on each of the multiple personalized pages; and providing a second-level set of two or more reusable objects, no more than one of which appears on any of the multiple personalized pages. Implementations of the invention can include the following advantageous features. The technique includes providing a third-level set of two or more reusable objects, each third-level reusable object being different from all the reusable objects in the second-level set, and no more than one of the third-level reusable objects appearing on any of the multiple personalized pages. The technique includes providing multiple third-level sets of reusable objects, each of the multiple third-level sets corresponding to one of the second-level objects in the second-level set, each third-level object appearing only in a page in which the corresponding second-level object appears.

In general, in another aspect, the invention features apparatus for use in a printing system for printing pages described by page description language input. The apparatus includes an integrated rasterizer-compositor module having means for rendering page description language objects into raster data and means for compositing raster data into a frame buffer. Implementations of the invention can include the following advantageous features. The apparatus includes a connector operable to connect the module physically and electrically to a bus configured to receive multiple such rasterizer-compositor modules. The bus is operatively coupled to a cache memory device. The printing system is a variable printing system configured to receive multiple integrated rasterizer-compositor modules.

In general, in another aspect, the invention features apparatus for use in a printing system for printing pages described by page description language input. The apparatus includes an integrated rasterizer-compositor module having a processor subsystem coupled to a memory subsystem, the processor subsystem including one or more processors operable to execute program instructions stored in the memory subsystem, the memory subsystem being configured with instructions to cause the processor subsystem to render page description language reusable objects into raster data reusable objects and causing the raster data reusable objects to be stored in a cache; and composite page description language reusable objects and other objects into a frame buffer by reading reusable object raster data from the cache and compositing the raster data into the frame buffer and by rendering and compositing other objects into the frame buffer on the fly as such other objects are called for by a paint order applicable to the frame buffer.

In general, in another aspect, the invention features apparatus for use in a printing system for printing pages described by page description language input. The apparatus includes a scheduler that has a programmable processor and a memory storing a program with instructions for causing the processor to receive from an input stream a description identifying the objects required for a print area, the paint order of the required objects, and the required objects themselves or pointers to the required objects, the required objects being either identified as reusable objects or not so identified; to cause only the reusable objects to be rendered and stored in a cache before being used in compositing the print area; to maintain a page object list, being a data structure holding information about each required object, including the location of each required object on the print area; and to cause the print area to be composited according to the paint order and the page object list. Implementations of the invention can include the following advantageous features. The program further includes instructions to assign a reusable object to a first integrated rasterizer-compositor for rendering; and to assign the page area to a second integrated rasterizer-compositor for rendering and compositing. The program further includes instructions to assign to the first rasterizer-compositor a frame buffer memory.

In general, in another aspect, the invention features a technique for preparing personalized pages for printing. The technique includes receiving an input stream describing multiple personalized pages in terms of graphical objects including reusable objects and other objects; receiving in the input stream a paint order for each page of the multiple personalized pages, the paint order for a page specifying the order of painting the graphical objects on the page; rendering each reusable object and storing the resulting raster data before using the resulting raster data in compositing any of the multiple pages; and compositing each page by painting into a frame buffer the graphical objects for the page in the paint order for the page, each reusable object being painted by compositing into the frame buffer the previously-stored resulting raster data for the reusable object, and each other object being rendered and composited into a page directly as the other object is called for by the paint order.

Advantages that may be seen in implementations of the invention include one or more of the following. Using parallel integrated processors to render single-use objects on demand into a frame buffer provides inexpensive high-speed printing of personalized data, and provides a relatively simple apparatus. Mask data need not be generated for single-use objects.

An integrated rasterizer-compositor can use the same hardware processor to perform both rendering and compositing functions.

A system implementing methods of the invention can print documents defined as having multiple levels of reuse, so that a tree of reuse can be defined, for example, with a root that includes objects that appear on all pages, leaves that include single-use objects, and intermediate nodes that include different reusable objects. The system maintains reusable objects in rendered form in a cache and renders each page from its own page list of reusable and single-use objects. The system can easily be used, for example, to print a personalized mailing in which every page has the same map of the United States and the unique address of the recipient, and in which the city of the recipient is a reusable object printed over the state of the recipient, which is a reusable object printed over the United States.

Other features and advantages of the invention will become apparent from the following description and from the claims.

DETAILED DESCRIPTION

Figure 1:
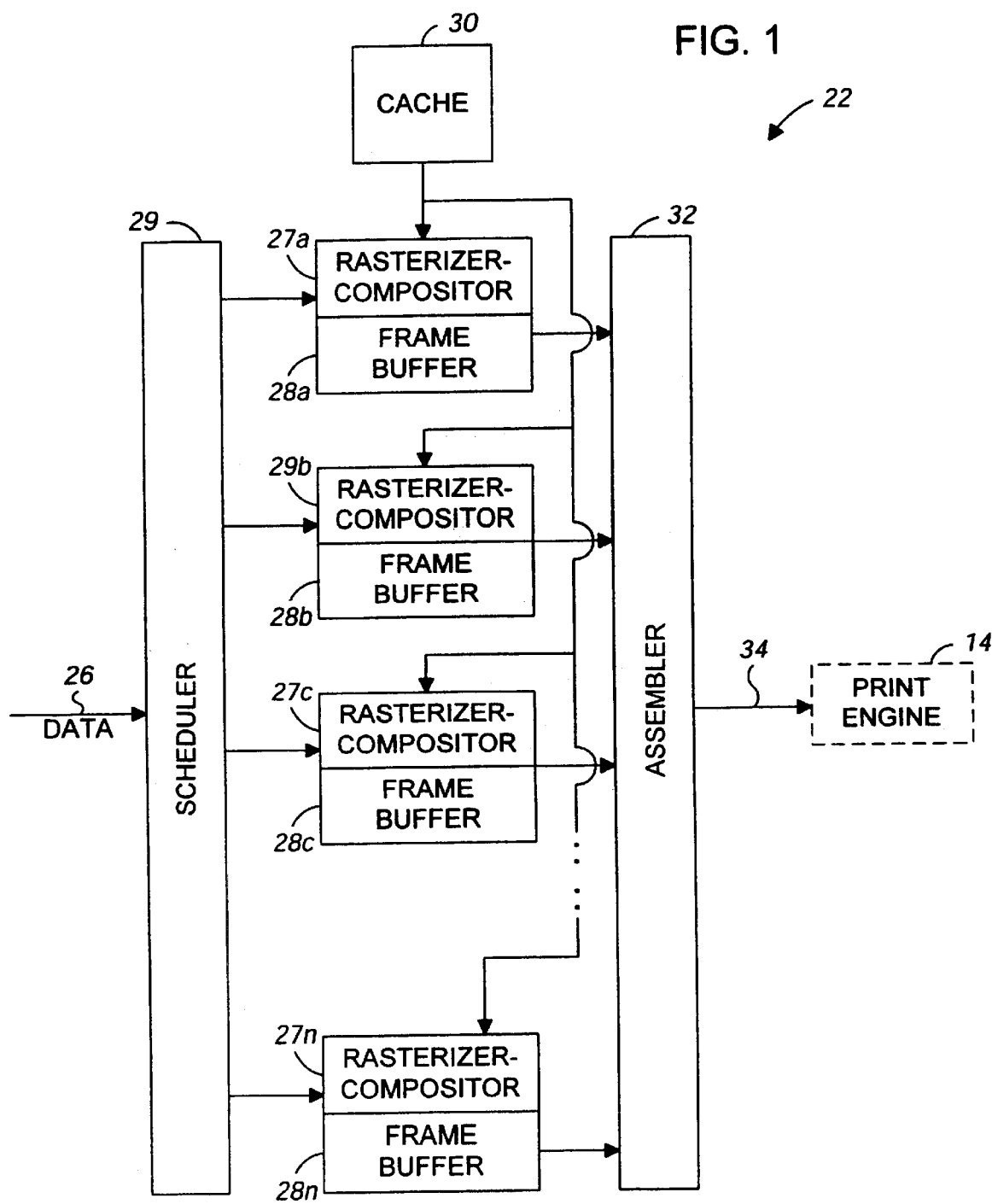
FIG. 1 is a block diagram of an implementation of integrated raster image processor and compositor functions in accordance with the invention.

FIG. 1 is a schematic diagram showing the architectural components and the flow of data in a variable printing system 22. The system 22 includes one or more integrated rasterizer-compositors 27a–27n, each having an associated frame buffer 28a–28n. The rasterizer-compositors are connected in parallel to permit parallel processing of PDL objects. Each rasterizer-compositor is connected to communicate with a cache 30—which may be implemented as a random access memory (RAM), a magnetic disk or disk array, or other form of data storage. The cache is accessible by all rasterizer-compositors. The associated frame buffers 28a–28n can be separate parts (address ranges) of a single common RAM (associated with, or assigned to, individual rasterizer-compositors statically or dynamically) or individual dedicated RAMs physically connected to, or part of, each rasterizer-compositor. Each rasterizer-compositor receives page description language data from (or-under the control of) pre-processing scheduler 29, as will be described later, and produces in its frame buffer raster data suitable for printing. When data is ready for printing, it is communicated to a high-speed print engine 14, typically a high-speed digital print engine. The process of assembling rendered data in frame buffers for printing is a process that is managed by an assembler 32.

Each rasterizer-compositor 27a–27n can be implemented as a separate hardware module including one or more programmable processors programmed to implement the processes that will be described. Program modules can be stored on memory on each hardware module or on memory shared by multiple hardware modules. Frame buffers 28a–28n can be implemented as separate storage components on each hardware module or portions of a shared address space, allocated statically or dynamically. Separate rasterizer-compositor hardware modules can advantageously be implemented as plug-in modules, such as printed circuit board modules, for installation in a shared backplane or bus. The use of plug-in modules permits the capacity of the system 22 to be scaled to meet printing requirements, and in particular to match the speed of rendering to the speed of the print engine. Alternatively, each rasterizer-compositor 27a–28n can be implemented as a set of tasks that can be run on one or more processors of a multi-tasking, multi-processor computing system. The processors of such a multi-processor system can share a common memory space represented by the frame buffers 28a–28n. Any of these and other alternative forms of parallel, multi-processor system can provide simultaneous processing of one or more of the rasterizer-compositor functions, thereby reducing the time that processing resources will be idle.

In the particular implementation being described, the page description language used is PDF, version 1.2 or later. As a page description language, PDF has a number of features that are advantageous in the context of the present invention. It is device independent. It is highly portable. It is object based, meaning that the language elements describing a page or an element of a page are distinct objects in a PDF file or stream of data. It is page independent, meaning that a print file is made up of discrete page units that can be processed separately, and that the appearance of a page can be computed without knowledge of the appearance of a previous page (or any other page), and therefore that pages can be rendered independently of each other and in parallel. It supports shared objects and has an efficient structure for referencing and retrieving them. It not only contains graphical objects, it contains information describing the attributes and the placement of the graphical objects in the document in its printed form.

One feature of PDF is Forms Data Format (FDF), a file format used, for example, for Acrobat® forms data. FDF can be used, for example, to generate stand-alone files containing form data that can be stored, transmitted electronically, and imported back into the corresponding form. PDF and FDF are described in Adobe Systems Incorporated, Portable Document Format Reference Manual Version 1.2, Nov. 27, 1996, available at http://www.adobe.com/supportservice/devrelations/technotes.html. Acrobat is a trademark of Adobe Systems.

Portable Document Format represents text and graphics using the imaging model of the PostScript® language. PostScript is a trademark of Adobe Systems. Like a PostScript language program, a PDF page description draws a page by placing "paint" on selected areas. The paint figures can be letter shapes, regions defined by combinations of lines and curves, or sampled images such as digitally sampled representations of photographs. The paint can be any color. Any figure can be clipped to another shape, so that only portions of the figure within the shape appear on the page. When a PDF description of a page begins, the page is completely blank. Operators in the page description place marks on the page, and each new mark completely obscures any marks it may overlay.

The rasterizer-compositors 27a–28n receive PDF objects through a scheduler 29, which controls the operation of the system 22 by making assignments to the rasterizer-compositors. The scheduler 29 receives PDF objects and other data from-a computer or other source over one or more input data paths 26. The other data includes data describing the individual contents of the pages to be printed. This information may be provided internally or externally to the PDL stream, in a job ticket, for example. In one implementation, this information is found in an input PDF file. In the implementation that will be described, this information is found in an FDF input file and in the PDF input files called out as templates by the FDF input file. The scheduler 29 can be implemented as a computer program implementing the actions described in this specification and running on a computer, such as a general purpose computer or a dedicated embedded computer, which is connected to communicate with all of the rasterizer-compositors 27a–28n.

Using the information in an input file, which represents a print job, the scheduler 29 obtains page layout information; determines which objects appear where on which pages of the document and what the paint order of the objects on each page is; and designates objects as reusable (meaning, they are expected to be used more than once in the print job) or as single-use (meaning, they are expected to be used only once in the document) by recognizing or categorizing them as such. To simplify the discussion to aspects germane to the invention, of the PDL data received by the scheduler, only the handling of reusable object data and single-use object data for a given page will be described.

In the implementation being described, PDF form objects that have an XUID attribute are categorized and treated as reusable, and other objects, as single-use. In this context, a form is a type of XObject: it is a self-contained description of any text, graphics, or sampled images. A form can be drawn multiple times on several pages or at different locations on a single page. For forms that have an XUID attribute, the XUID is an identifier that uniquely identifies the form, which allows the form to be cached after the first time it has been drawn. Forms are described in Adobe Systems Incorporated, Portable Document Format Reference Manual Version 1.2, cited above, pages 175–185, and 272, which are incorporated herein by reference.

Figure 2:
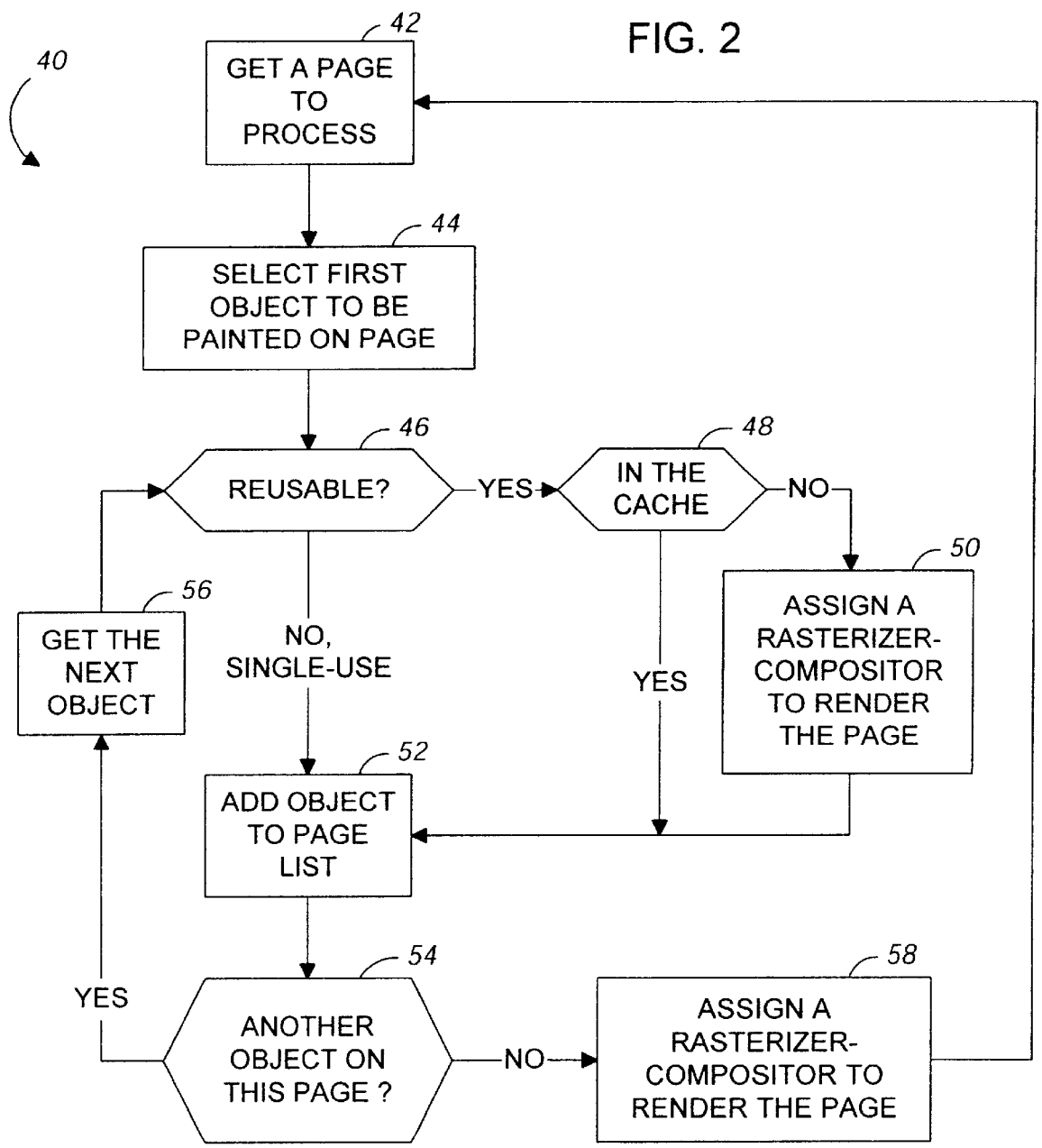
FIG. 2 is a flowchart illustrating operation of a preprocessing scheduler in operation in accordance with the invention.

FIG. 2 is a flowchart 40 illustrating pre-processing steps performed by the scheduler 29 in processing a page. These steps can be performed essentially in parallel for as many pages as the set of rasterizer-compositors 27a–28n can handle in parallel. First, the scheduler obtains description data identifying the objects required by the page and their paint order, along with the required objects themselves or pointers to the objects (step 42). In one implementation, the positions of objects on the pages are specified in PDF files that are templates called out by an FDF input file, and the objects themselves are expressed in PDF. In this implementation, information about which page objects go into which fields in a particular copy of a document is stored in the FDF file. The data can be organized to have a PDF file per page element or to have a PDF file that is a library with many page elements in it.

For each of the required objects, the following steps are performed (loop from steps 54 to step 46). First, the object is identified as a single-use object or reusable object (step 46). If it is reusable, the scheduler checks whether the object has already been rendered and stored in the cache 30 (step 48). If not, then the object is assigned to an available rasterizer-compositor and a place for the object is reserved in the cache (step 50). The selected rasterizer-compositor renders the reusable object into a frame buffer and stores the resultant data—namely a pixelmap and a mask—in the cache 30. The mask identifies which pixels of the pixelmap are transparent (or, conversely, which pixels are painted into the frame buffer when the pixelmap is composited with previously-painted objects). A mask is conventionally a bitmap with the dimensions of the pixelmap and one bit per pixel to specify whether or not the pixel is to be written; however, the mask can be stored in any form of data structure that carries the necessary information.

If the reusable object is already in (or on its way to) the cache, then a pointer to the location in the cache is used in place of the object. In general, this will substitute a reference into the cache for a reference into the input data to a shared object or for a reference to an external rendered file object.

Whether or not the object was in the cache, information about the object and its location is added to a page object list for the page (step 52).

Similarly, if the object is a single-use object. (step 46), then it is simply added to the page object list (step 52). If more page objects remain to be considered ("yes" branch of step 54), the next one is selected (step 56) and the scheduler returns to step 46.

A single-use object may be in stream, that is, in an input file, or external, that is, pointed to by a linking object, such as an Open Prepress Interface (OPI) comment. In the particular implementation being described, a single-use object that is in stream will be found in an FDF input file. As has been mentioned, the FDF input file calls out a template (in a PDF file). For each of the fields in the template, the FDF file defines an appearance. The FDF file can define the appearance with a pointer to a page in the PDF file or, for small objects that are rendered quickly, the appearance can be defined by PDF objects in the FDF file. The pointer can be expressed as a file name with a page number, or as a file name with a symbolic reference with a symbol defined in the PDF file. The PDF file that has the object can store it in a variety of ways, such as by using OPI or by using a PDF external stream to store the actual object data.

When all objects required for the page have been considered and added to the page object list ("no" branch of step 54), the scheduler assigns the page to an available rasterizer-compositor (step 58) for rendering into a frame buffer. In assigning the page, the scheduler passes the page object list for the page to the assigned rasterizer-compositor, along with a sequence number to place the page in the sequence of pages in the print run. The page object list need not literally be a list; it can be any data structure that identifies the necessary objects and their paint order, originally defined by the author of the source PDF input file. For example, the page object list can be a minimal PDF file containing one Page object.

Having a page assignment, a rasterizer-compositor paints the objects into the frame buffer according to the paint order of the page, by compositing reusable elements into the frame buffer and rendering single-use elements into the frame buffer. The system can take advantage of this dual capability of the rasterizer-compositor to perform interleaved processing of single-use objects and reusable objects, taking advantage of the parallel availability of the rasterizer-compositors as assigned by the scheduler.

If the system has a common frame buffer portions of which are assigned dynamically to the rasterizer-compositors, the scheduler also allocates that portion of the frame buffer into which the page should be rendered to the assigned rasterizer-compositor. The scheduler then loops back to step 42 to pre-process another page.

In an alternative implementation, the scheduler also recognizes when a cached object is no longer needed—that is, when the last page to use the cached object has been rendered—and frees that part of the cache. To do so, the scheduler simply reads ahead to the end of the print job and records for each reusable object the page on which it is last used.

In a further alternative implementation, the scheduler can combine two reusable objects and create a new, single object in the cache to improve performance, if the additional cache space required to store the combined object is available. For example, it can be advantageous to combine objects that overlap each other. When objects overlap, the pixels in the overlap area are painted twice, which is inefficient. When a page is hard to composite at engine speed because of excessive object overlap, combining overlapping objects can eliminate some of the redundant pixel painting.

When objects are combined, the new, combined object can be used wherever the two (or more) original objects are adjacent to each other in the paint order—or at least where neither of them overlaps, or is overlapped by, any object that lies between them in the paint order—and are in the same paint order if they overlap each other. If cache space should be required for other purposes, the combined object can be discarded, once it is no longer required by a page object list. While the combined object is available, the scheduler recognizes sequences of objects in the input file in which references to the original objects can be replaced by a reference to the combined object, and does so.

Figure 3:
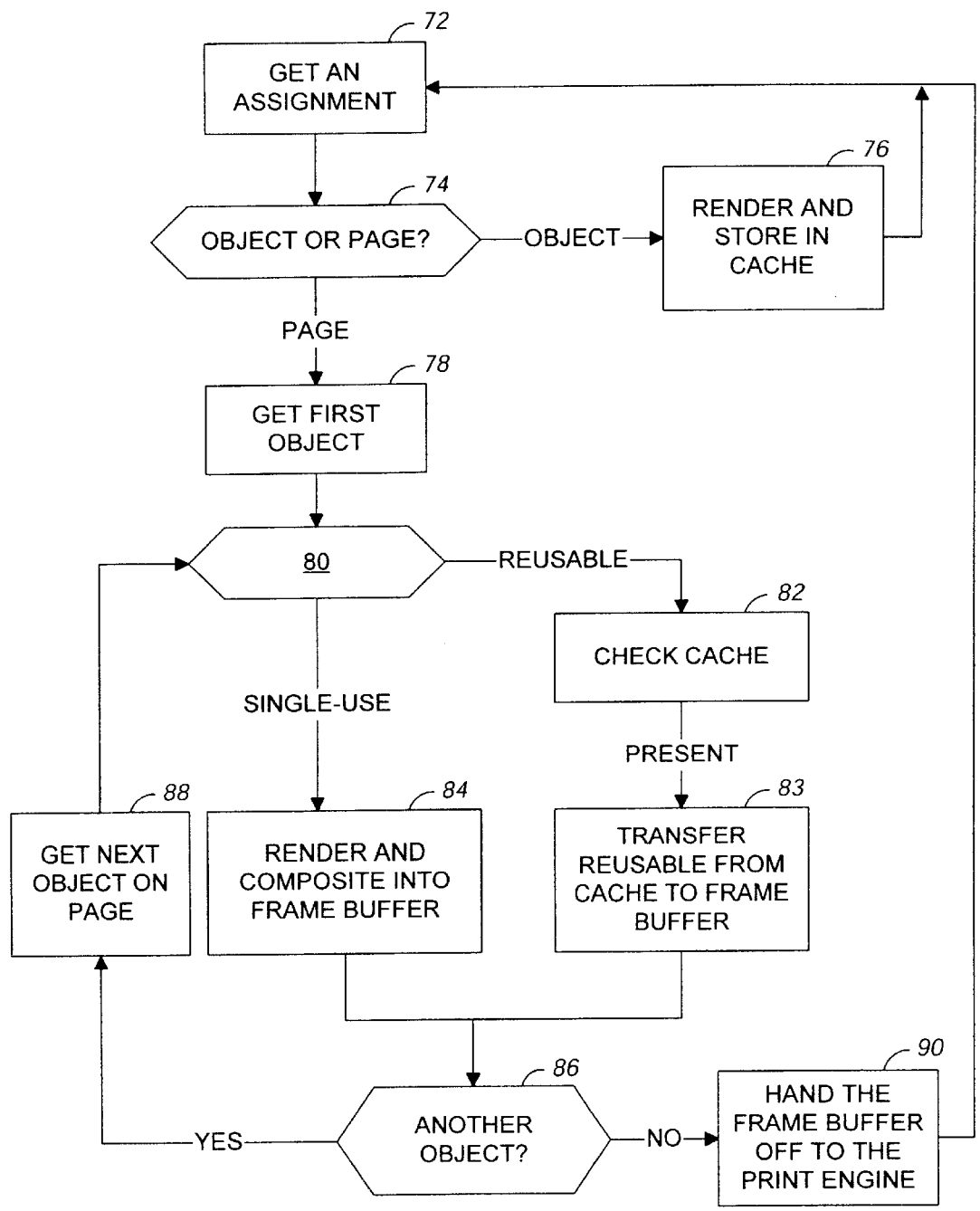
FIG. 3 is a flowchart illustrating operation of a rasterizer-compositor in operation in accordance with the invention.

Shown in FIG. 3 is a flowchart 70 of operations performed by a rasterizer-compositor in accordance with the invention. When the rasterizer-compositor receives an assignment from the scheduler (step 72), it recognizes the assignment as an assignment either to render a single object or to process and composite an entire page of objects (step 74).

If the assignment is to render a single object, then that object is reusable; the rasterizer-compositor renders the object, creating a mask to identify transparent pixels, stores the resulting data in the cache (step 76) and notifies the scheduler the assignment has been completed. The rasterizer-compositor then loops back to receive the next assignment (step 72). In an alternative implementation, a mask is created only if necessary to identify transparent.

pixels in the rendered object. A mask would be recognized as unnecessary, for example, if it were known that the object would always be the first object painted in any frame buffer.

If the assignment is to process and composite an entire page, then the first object in the paint order of the page is retrieved (step 78). It is recognized as either a single-use object or a reusable object (step 80). If it is a reusable object, it will have been scheduled to the same or a different rasterizer-compositor, and the cache is checked to see if the object has already been rendered and is in the cache. If it is not, then the rasterizer-compositor waits until the object does appear in the cache (step 82). In an alternative implementation, the scheduler 29 is responsible for tracking the rendering of reusable objects and will not schedule a page to be composited until all of the reusable elements required are available in the cache.

When the required data is in the cache, the rasterizer-compositor reads the object from the cache and composites it (using the mask data as necessary) into the frame buffer designated for, or attached to, the rasterizer-compositor (step 83). If the object is the first object in the designated frame buffer, or if there are no transparent pixels in the pixelmap, the pixelmap can simply be copied from the cache to its place in the frame buffer with a bit block transfer operation. Otherwise, the rasterizer-compositor uses both the pixelmap and the mask from the cache to paint the object into the frame buffer, to prevent the unwanted overwriting of pre-existing frame buffer data.

If, on the other hand, the object is a single-use object, then it is rendered and painted directly into the designated frame buffer by the rasterizer-compositor (step 84). No mask is needed or created, because only the non-transparent pixels created in rendering the object are painted into the frame buffer by the rasterizer-compositor.

Including a mask with an object pixelmap in the cache provides a number of advantages. First, it allows reusable objects to be placed anywhere in the paint order on any page, both after other reusable objects and after single-use objects, so that a reusable object can be painted over any other reusable object or over a single-use object. Similarly, because a rasterizer-compositor paints a single-use object directly into the designated frame buffer, any number of single-use objects can be placed anywhere in the paint order and appear over any number of other objects, single-use or reusable, with no increase in complexity in either the processing or the hardware required to render the pages.

If any object remains to be added to the page (step 86), that object is retrieved (step 88) and the process loops back to process the object (step 80). If all objects on the page have been processed, the assembler 32 is notified that the page print data is available for a print engine 14 (FIG. 3) (step 90). When the print engine is ready for the data, the data is transmitted to the print engine and the frame buffer is cleared and available for a new page. The scheduler is notified when the rasterizer-compositor has completed the page and its frame buffer is again available, at which time the rasterizer-compositor loops back to wait for another assignment (step 72). In an alternative implementation, the rasterizer-compositor can have more than one frame buffer (for example, it can have frame buffer memory with frame buffers for each of a number of multiple bands), and the rasterizer-compositor becomes available for another assignment when its current assignment is complete and any of its frame buffers is available. In a further alternative implementation, frame buffers are allocated and assigned to rasterizer-compositors dynamically as needed from a pool of memory, and a rasterizer-compositor becomes available for another assignment when its current assignment is complete and a frame buffer can be allocated for the assignment.

When a rasterizer-compositor notifies the assembler 32 that a page is finished, the rasterizer-compositor provides page sequence number information, which was provided to the rasterizer-compositor by the scheduler, and originally derived from the PDF input file. As each rasterizer-compositor finishes its assignment, the assembler is informed of the frame buffer locations. If the rasterizer-compositors have processed the pages in bands, the assembler is also informed of the band sequence for printing by the scheduler. The print engine is directed by the assembler to the frame buffer that contains the next page, band or other unit of print data, which is transmitted on output data path 34. After the print. engine has received the data from the frame buffer, the frame buffer can be cleared to prepare it for a rasterizer-compositor to paint into it again.

In an alternative implementation, the rasterizer-compositors are numbered and the scheduler has a link to the assembler. When the scheduler assigns a page to a rasterizer-compositor, the scheduler also notifies the assembler that the assembler can expect that particular page from that particular rasterizer-compositor. When a rasterizer-compositor notifies the assembler that a page is available, the assembler concludes that the page is the one the scheduler had identified as having been assigned to that rasterizer-compositor.

Thus, each parallel rasterizer-compositor in the system performs both the raster image processing and compositing functions for a page (or band) of data.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor. Method steps of the invention may be performed by a programmable processor executing a program of instructions operating on input data and generating output. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, such as semiconductor memory devices, for example EPROM, EEPROM, and flash memory devices; magnetic disks; magneto-optical disks; and CD-ROM disks. Any of the foregoing may be supplemented by, or incorporated in, specially-designed ASICs (application-specific integrated circuits).

The present invention has been described in terms of specific embodiments which ate illustrative of the invention and are not to be construed as limiting. For example, in the description of the operation of the system, each rasterizer-compositor was generally described as processing a page. As is well known, a page may be processed in bands, in which case the processing of the page may occur in parallel in multiple rasterizer-compositors. However, for the sake of clarity, parallel operation was generally described only at the page level, the application of the teaching of this specification to bands or other levels of granularity being readily made. Other embodiments are within the scope of the following claims.

What is claimed is:

1. A method for rendering a description of a print area, the description including graphical objects and a paint order for the graphical objects, the graphical objects including one or more reusable objects that are expected to be used more than once in a print job, and one or more other objects that are expected to be used only once in the print job, the method comprising:

rendering the reusable objects and storing the resulting raster data in a cache; and then rendering and compositing the print area by painting the reusable objects and the other objects in the paint order into a frame buffer memory, the reusable objects being read as raster data from the cache and composited into the frame buffer memory, and the other objects being rendered directly into the frame buffer as the other objects are required by the paint order.

2. The method of claim 1, wherein the print area is at least a part of a page, the method further comprising:

receiving a page description language description input stream comprising a description of the page, the reusable objects, and the other objects, the input stream comprising page layout information specifying the positions of the reusable objects and of the other objects on the page, and further comprising information identifying graphical objects as reusable.

3. The method of claim 2, wherein:

the input stream is expressed in elements of the Portable Document Format (PDF) version 1.2 page description language; and the information identifying a graphical object as reusable comprises the presence of an XUID attribute in a form object.

4. The method of claim 1, wherein:

the raster data resulting from the rendering of the reusable objects includes data specifying which pixels of the raster data are transparent.

5. The method of claim 4, wherein the data specifying transparent pixels is a bitmap mask.

6. The method of claim 1, wherein:

the reusable objects include two objects overlapping each other on the print area.

7. The method of claim 1, further comprising:

making the contents of the frame buffer memory available to a print engine when rendering of the print area is completed.

8. The method of claim 2, wherein the raster data resulting from the rendering of the reusable objects includes data specifying which pixels of the raster data are transparent; and the method further comprises making the contents of the frame buffer memory available to a print engine when rendering of the print area is completed.

9. The method of claim 1, further comprising:

receiving the reusable objects and the other objects in a print data stream in the Portable Document Format page description language, the print data stream comprising page layout information specifying the positions of the reusable objects and the other objects on a page.

10. The method of claim 9, wherein the print area is a page.

11. The method of claim 1, wherein the cache comprises disk storage and the frame buffer memory is an assigned portion of a random access memory.

12. The method of claim 4, further comprising:

providing a plurality of integrated rasterizer-compositors;

for each of the reusable objects, assigning one of the plurality of rasterizer-compositors to render the reusable object; and assigning one of the plurality of rasterizer-compositors to render the print area, wherein any or all of the selected rasterizer-compositors can be the same or different rasterizer-compositors.

13. The method of claim 12, further comprising:

providing a selector to receive the description of the print area, to assign rasterizer-compositors to render reusable objects, and to assign a rasterizer-compositors to render the print area.

14. The method of claim 12, further comprising:

communicating, to the rasterizer-compositor selected to render the print area, the graphical objects to be printed on the print area and the paint order of the graphical objects.

15. A method for preparing personalized pages for printing, comprising:

receiving an input stream describing a plurality of personalized pages in terms of graphical objects comprising reusable objects that are expected to be used more than once in a print job, and other objects that are expected to be used only once in the print job;

rendering each reusable object and caching the resulting raster data for multiple use on one or more of the personalized pages; and rendering a first page of the personalized pages by compositing a first and a second reusable object and a first other object, rendering a second page of the personalized pages by compositing the first reusable object and a third reusable object different from the second reusable object and a second other object different from the first other object, the first page not including the third reusable object and the second page not including the second reusable object.

16. The method of claim 15, further comprising:

making the composited page data available to a digital printing press.

17. The method of claim 15, wherein the input description is expressed in elements of the Portable Document Format (PDF) version 1.2 page description language.

18. The method of claim 15, wherein the resulting raster data includes data identifying transparent pixels.

19. The method of claim 15, wherein:

the raster data resulting from reusable objects is stored in a cache before compositing into a page; and the other objects are painting by rendering and compositing into a composited page on the fly.

20. The method of claim 15, wherein:

at least one of the plurality of pages includes multiple overlapping reusable objects.

21. A method for preparing personalized pages for printing on a variable printing system, comprising:

providing a print data stream describing a plurality of personalized pages in terms of graphical objects comprising reusable objects that are expected to be used more than once in a print job, and other objects that are expected to be used only once in the print job;

providing a first-level set of one or more reusable objects, each of which appears on each of the plurality of personalized pages; and providing a second-level set of two or more reusable objects, no more than one of which appears on any of the plurality of personalized pages.

22. The method of claim 21, further comprising:

providing a third-level set of two or more reusable objects, each third-level reusable object being different from all the reusable objects in the second-level set, and no more than one of the third-level reusable objects appearing on any of the plurality of personalized pages.

23. The method of claim 21, further comprising:
providing a plurality of third-level sets of reusable objects, each of the plurality of third-level sets corresponding to one of the second-level objects in the second-level set, each third-level object appearing only in a page in which the corresponding second-level object appears.

24. For use in a printing system for printing pages described by page description language input, apparatus comprising:
an integrated rasterizer-compositor module having means for rendering page description language objects into raster data and means for compositing raster data into a frame buffer; and
a connector operable to connect the module physically and electrically to a bus configured to receive a plurality of such rasterizer-compositor modules.

25. The apparatus of claim 24, wherein the bus is operatively coupled to a cache memory device.

26. The apparatus of claim 24, wherein the printing system is a variable printing system configured to receive a plurality of integrated rasterizer-compositor modules.

27. For use in a printing system for printing pages described by page description language input, apparatus comprising:
an integrated rasterizer-compositor module having a processor subsystem coupled to a memory subsystem, the processor subsystem comprising one or more processors operable to execute program instructions stored in the memory subsystem, the memory subsystem being configured with instructions to cause the processor subsystem to:
render page description language reusable objects that are expected to be used more than once in a print job into raster data reusable objects and causing the raster data reusable objects to be stored in a cache; and
composite page description language reusable objects and other objects that are expected to be used only once in the print job into a frame buffer by reading reusable object raster data from the cache and compositing the raster data into the frame buffer and by rendering and compositing other objects into the frame buffer on the fly as such other objects are called for by a paint order applicable to the frame buffer.

28. For use in a printing system for printing pages described by page description language input, a scheduler comprising a programmable processor and memory storing a program comprising instructions for causing the processor to:
receive from an input stream a description identifying the objects required for a print area, the paint order of the required objects, and the required objects themselves or pointers to the required objects, the required objects being either identified as reusable objects or not so identified;
cause the reusable objects and only the reusable objects to be rendered and stored in a cache before being used in compositing the print area;
maintain a page object list, being a data structure holding information about each required object, including the location of each required object on the print area; and
cause the print area to be composited according to the paint order and the page object list.

29. The scheduler of claim 28, wherein the program further comprises instructions to:
assign a reusable object to a first integrated rasterizer-compositor for rendering; and
assign the page area to a second integrated rasterizer-compositor for rendering and compositing.

30. The scheduler of claim 29, wherein the program further comprises instructions to:
assign to the first rasterizer-compositor a frame buffer memory.

31. A method for preparing personalized pages for printing, comprising:
receiving an input stream describing a plurality of personalized pages in terms of graphical objects comprising reusable objects and other objects;
receiving in the input stream a paint order for each page of the plurality of personalized pages, the paint order for a page specifying the order of painting the graphical objects on the page;
rendering each reusable object and storing the resulting raster data before using the resulting raster data in compositing any of the plurality of pages; and
compositing each page by painting into a frame buffer the graphical objects for the page in the paint order for the page, each reusable object being painted by compositing into the frame buffer the previously-stored resulting raster data for the reusable object, and each other object being rendered and composited into a page directly as the other object is called for by the paint order.

* * * * *

UNITED STATES PATENT AND TRADEMARK OFFICE
CERTIFICATE OF CORRECTION

PATENT NO. : 6,441,919 B1
DATED : August 27, 2002
INVENTOR(S) : Michael L. Parker et al.

It is certified that error appears in the above-identified patent and that said Letters Patent is hereby corrected as shown below:

<u>Column 14,</u>
Line 34, after "reusable objects" insert -- that are expected to be used more than once in a print job, --.
Line 34, after "other objects" insert -- that are expected to be used only once in the print job --.

Signed and Sealed this

Fourth Day of November, 2003

JAMES E. ROGAN
*Director of the United States Patent and Trademark Office*